(12) United States Patent
Tombling et al.

(10) Patent No.: US 6,373,549 B1
(45) Date of Patent: Apr. 16, 2002

(54) DIFFRACTIVE SPATIAL LIGHT MODULATOR AND DISPLAY

(75) Inventors: Craig Tombling, Oxfordshire (GB); Michael Geraint Robinson, Boulder, CO (US); Nicholas Mayhew, Oxford (GB); Tomoaki Kuratate, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/489,078

(22) Filed: Jan. 21, 2000

(30) Foreign Application Priority Data

Jan. 23, 1999 (GB) ................................ 9901450

(51) Int. Cl.[7] .................... G02F 1/1335; G02F 1/13; G02F 1/343
(52) U.S. Cl. .................... 349/201; 349/119; 349/141
(58) Field of Search .................... 349/201, 113, 349/117, 119, 141; 359/95, 247

(56) References Cited

U.S. PATENT DOCUMENTS

| 5,182,665 | A | | 1/1993 | O'Callaghan et al. | ........ | 359/95 |
| 5,552,916 | A | | 9/1996 | O'Callaghan et al. | ........ | 359/95 |
| 5,973,817 | A | * | 10/1999 | Robinson et al. | | |
| 6,078,374 | A | * | 6/2000 | Sharp et al. | | |
| 6,094,249 | A | * | 7/2000 | Robinson et al. | | |
| 6,104,368 | A | * | 8/2000 | Bonnet et al. | | |

FOREIGN PATENT DOCUMENTS

GB 2313920 A 10/1997

OTHER PUBLICATIONS

Search Report, Application No. GB 9901450.8, dated Apr. 20, 1999.

* cited by examiner

*Primary Examiner*—Toan Ton
*Assistant Examiner*—Julie Ngo
(74) *Attorney, Agent, or Firm*—Renner, Otto, Boisselle & Sklar (57) ABSTRACT

A diffractive spatial light modulator comprises first and second substrates (1, 2) between which an optical path is defined comprising, in order, first (8a,8b), second (5,6), and third (8a,8b) half wave retarders. The second retarder (6,5) has a fixed optic axis (9c) whereas the first and third retarders have switchable optic axes (9a,9b). The fixed optic axis (9c) is oriented outside the switching ranges of the switchable optic axes (9a,9b). The modulator is pixellated and each pixel comprises a switchable phase-only diffraction grating. Each pixel is switchable between a first mode in which incident light is output in the zeroth order diffraction lobe and a second mode in which incident light is deflected into higher order diffraction lobes. The spatial light modulator may be used in high brightness projection displays.

33 Claims, 13 Drawing Sheets

DIFFRACTIVE SPATIAL LIGHT MODULATOR AND DISPLAY

BACKGROUND OF THE INVENTION

1. Field of the Invention

The present invention relates to a diffraction spatial light modulator and to a display incorporating such a modulator. Such a display may be of the projection type and may be used to provide large screen TV viewing and business presentations.

2. Description of the Related Art

A known type of projection display is disclosed in a paper entitled "High-Definition Projection System Using DMD Display Technology", by G. Saxtro, T. Ballew, and J. Iwai, SID 1995, pages 70 to 73. This display uses digital micromirror devices (DMD) in which electrostatic forces are used to tilt planar micromirrors so as to selectively deflect light from spatial light modulator picture elements to a projection optical system. The individual micromirrors are attached to a CMOS chip by means of micro-fabricated pivot structures. A disadvantage of this type of display is that it is expensive to manufacture. Another disadvantage is that, during operation, the micromirrors have to make many rapid movements. This stresses the pivot structures, giving rise to reliability and working life issues.

Another type of projection display is disclosed in a paper entitled "Deformable Grating Light Valves for High-Resolution Displays" by R. B. Apte, F. S. A. Sandejas, W. C. Banyai, and D. M. Bloom, SID 1993 pages 807 and 808. This system uses a micromechanical light valve with electrostatic control of a reflection phase grating. The grating comprises mirrored air bridge beams which are arranged to lie with the mirrored surfaces at a half wave above a second plane mirror. The air gap is a quarter wave which reduces to zero when an electrostatic field is applied. In the absence of a field, the structure acts as a mirror whereas, in the presence of a field, the structure acts as a diffraction grating. A similar type of arrangement is disclosed in U.S. Pat. No. 5,311,360.

Although this type of display is less expensive then the DMD type, it is of a similar type relying on a mechanical movement giving rise to reliability and working life issues. Further, this type of display has a poorer contrast performance and, because of the limited aperture ratio which can be achieved, provides lower brightness for a given light source.

Another type of projection display is disclosed in a paper entitled "Recent Advances in Actuated Mirror Array (AMA) Projector Development" by G. Um, D. Foley, A. Szilagyi, J. B. Ji, Y. B. Joen, and Y. K. Kim, Asia Display 1995, pages 95 to 98. This display is similar to the digital mirror device described hereinbefore but uses piezo driven mirrors instead of electrostatically driven mirrors. Schlieren bars are used to introduce light into the optical system. These are reimaged onto themselves when the picture elements are switched off. This type of display requires relatively high voltages for the piezo drivers and is therefore inconvenient. Further, it is difficult to fabricate and so is of lower commercial viability.

Another projection display is disclosed in a paper entitled "Compact Liquid Crystal Projectors with High Optical Efficiency" by Y. Nagae, K. Ando, A. Asano, I. Takemoto, J. Havens, P. Jones, D. Reddy, and A. Tomita, SID 1995, pages 223 to 236. This display uses the nematic curvilinear aligned phase technique for selectively scattering light together with Schlieren optics. In particular, each pixel switches between a non-scattering mode, such as a reflective mode, in which light is directed into a well-defined path, and a scattering mode in which light is scattered over a range of angles. The display may therefore provide a good contrast ratio or high brightness but, because of its mode of operation, cannot simultaneously provide both a good contrast ratio and high brightness.

U.S. Pat. No. 5,434,690 discloses a liquid crystal device with pixel electrodes in an opposed striped form. When a field is applied to the striped electrodes of a pixel, light is scattered from the pixel. This type of device is only suitable for forming gratings which provide relatively small deflection angles of incident light. In order to provide acceptable efficiency, this requires the use of smaller more collimated light sources which in turn leads to unacceptable cost with poor reliability and a relatively short working life.

A spatial light modulator using ferroelectric liquid crystal technology is disclosed in a paper entitled "Diffractive Ferroelectric Liquid Crystal Shutters for Unpolarised Light" by M. J. O'Callaghan and M. A. Handschy, Optics Letters, Volume 16 No. 10, May 1995, pages 770 to 772 and in U.S. Pat. No. 5,552,916. The spatial light modulator disclosed in this paper is switchable between a first state in which it transmits incident light and a second state in which it acts as a phase diffraction grating. However, this type of modulator relies on the use of ferroelectric liquid crystals which are capable of providing a 90° switching angle of their optic axis. Such materials are available but exhibit very poor performance. For instance, the switching rate is slow and is inadequate for use at normal video refresh rates. Also these materials cannot be aligned adequately to avoid scattering of light.

Another spatial light modulator is disclosed in a paper entitled "Improved Transmission in a Two-Level, Phase Only, Spatial Light Modulator" by M. A. A. Neal and E. G. S. Page Electron. Lett. 30 (5) pages 445–6 1994. This paper discloses a spatial light modulator which is switchable between a non-diffractive mode and a diffractive mode in which alternative strips of the modulator rotate unpolarized light by plus and minus 45 degrees and an associated half wave retarder further rotates all the polarisation components of the light so as to provide phase-only modulation. This paper is exclusively concerned with providing efficient diffraction of polarised and wall-collimated light from a laser source. The modulator, the half wave retarder and a mirror are embodied as physically separate spaced elements or devices. Such an arrangement is therefore unsuitable for use as a display.

EP 0 811 872 discloses a diffractive spatial light modulator of the same type in which the various retarders (including one or more liquid crystal layers) and, in the case of reflective devices, the mirror are disposed between the substrates. Such devices may be used in projection displays.

U.S. Pat. No. 5,182,665 discloses a similar type of spatial light modulator.

SUMMARY OF THE INVENTION

According to a first aspect of the invention, there is provided a diffractive spatial light modulator comprising first and second substrates, a half wave retarder disposed between the first and second substrates, a quarter wave retarder disposed between the half wave retarder and the second substrate, and a reflector disposed between the quarter wave retarder and the second substrate, the half wave retarder comprising a plurality of picture elements, each of which comprises a plurality of first elongate regions interdigitated with a plurality of second elongated regions, the first regions having optic axes which are switchable between a first direction and a third direction, the second regions having optic axes which are switchable between a second direction and the third direction, and the quarter wave retarder having a fixed optic axis, the first and second directions being oriented at angles $\alpha_1$ and $\alpha_2$, respectively, relative to an arbitrary reference direction and the optic axis of the quarter wave retarder being oriented at an angle $\beta$ relative to the reference direction such that $(\alpha_1-\alpha_2)<90°$ and $\alpha_2+180°>\beta>\alpha_1$.

$(\alpha_1-\alpha_2)$ is preferably between 35° and 55°, more preferably between 40° and 50° and most preferably substantially equal to 45°.

The optic axis of the quarter wave retarder may be substantially perpendicular to the bisector of the first and second directions.

The half wave retarder may comprise a liquid crystal layer. The liquid crystal layer may comprise a ferroelectric liquid crystal layer. The liquid crystal layer may be disposed between first and second alignment layers. Each of the first and second alignment layers may comprises an obliquely evaporated layer of silicon oxide.

The first transparent electrode layer may be disposed between the first substrate and the half wave retarder. A second electrode layer may be disposed between the second substrate and the half wave retarder. At least one of the first and second electrode layers may comprise a plurality of electrode picture elements aligned with the picture elements of the half wave retarder, each electrode picture element comprising first and second electrode regions aligned with the first and second regions, respectively, of the half wave retarder. The second electrode layer may constitute the reflector.

According to a second aspect of the invention, there is provided a diffractive spatial light modulator characterised by first and second substrates, a first half wave retarder disposed between the first and second substrates, a second half wave retarder disposed between the first half wave retarder and the second substrate, a third half wave retarder disposed between the second half wave retarder and the second substrate, the first retarder comprising a plurality of picture elements, the third retarder comprising a plurality of picture elements aligned with the picture elements of the first retarder, each of the picture elements of each of the first and third retarders comprising a plurality of first elongate regions interdigitated with a plurality of second elongate regions, the first regions having optic axes which are switchable together between a first direction and a third direction, the second regions having optic axes which are switchable together between a second direction and the third direction, and the second half wave retarder having a fixed optic axis, the first and second directions being oriented at angles $\alpha_1$ and $\alpha_2$, respectively, relative to an arbitrary reference direction and the optic axis of the second half wave retarder being oriented at an angle $\beta$ relative to the reference direction such that $(\alpha_1-\alpha_2)>90°$ and $\alpha_2+180°>\beta>\alpha_1$.

$(\alpha_1-\alpha_2)$ is preferably between 35° and 55°, more preferably between 40° and 50° and most preferably substantially equal to 45°.

The optic axis of the second half wave retarder may be substantially perpendicular to the bisector of the first and second directions.

Each of the first and third retarders may comprise a liquid crystal layer. Each of the liquid crystal layers may comprise a ferroelectric liquid crystal layer. Each of the liquid crystal layers may be disposed between first and second alignment layers. Each of the first and second alignment layers may comprise an obliquely evaporated layer of silicon oxide.

A first transparent electrode layer may be disposed between the first substrate and the first half wave retarder. A second transparent electrode layer may be disposed between the second substrate and the third retarder. At least one of the first and second electrodes may comprise a plurality of electrode picture elements aligned with the picture elements of the first and third retarders, each of the electrode picture elements comprising first and second electrode regions aligned with the first and second regions, respectively, of the first and third retarders.

According to a third aspect of the invention, there is provided a display characterised by a spatial light modulator according to the first or second aspect of the invention.

The display may comprise a light source for illuminating the modulator and an optical projection system for receiving light only from a predetermined diffractive order from the modulator. The predetermined diffractive order may be the zeroth diffractive order. As an alternative, the predetermined diffractive order may be a first diffractive order.

It is thus possible to provide a spatial light modulator which overcomes the disadvantages of the prior art as described hereinbefore. Such a modulator can have individual high resolution picture elements which are switchable between a non-diffractive mode and a diffractive mode for use with unpolarised light. A display using such a spatial light modulator has good reliability and long operational life while providing both high intensity and high contrast ratios.

BRIEF DESCRIPTION OF THE DRAWINGS

The invention will be further described, by way of example, with reference to the accompanying drawings, in which.

Like reference numerals refer to like parts throughout the drawings.

DESCRIPTION OF THE PREFERRED EMBODIMENTS

Figure 1:
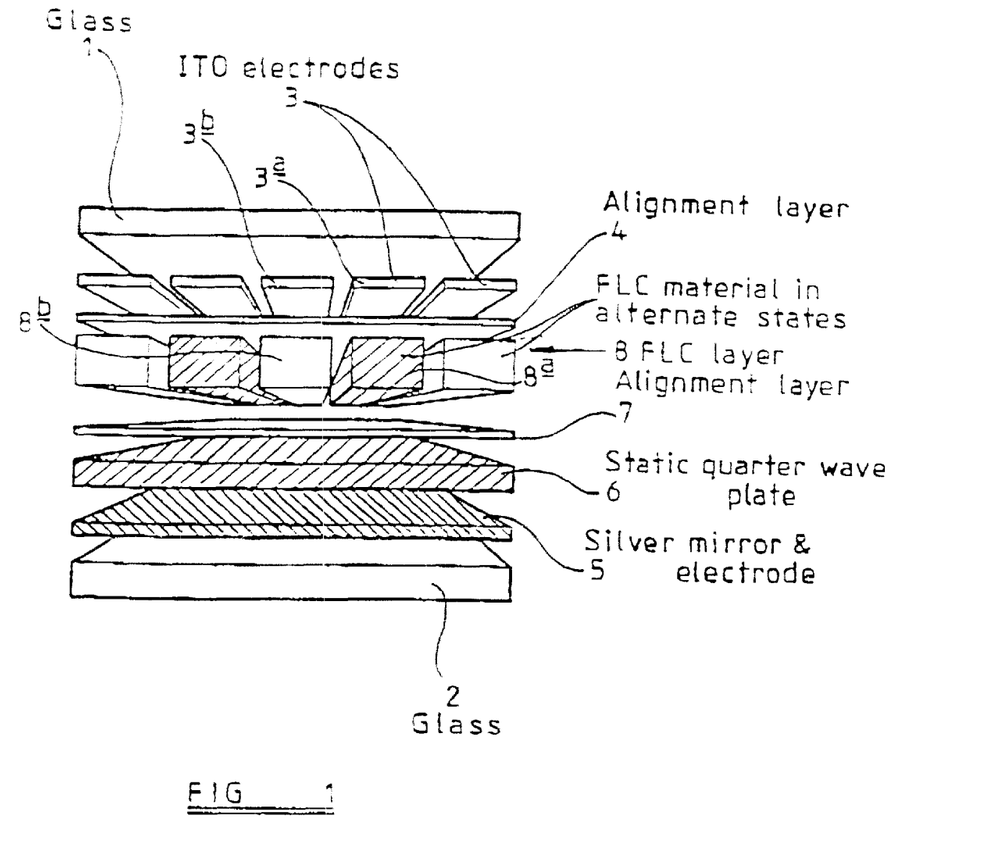
FIG. 1 is an exploded view of a spatial light modulator constituting an embodiment of the invention.
Figure 2:
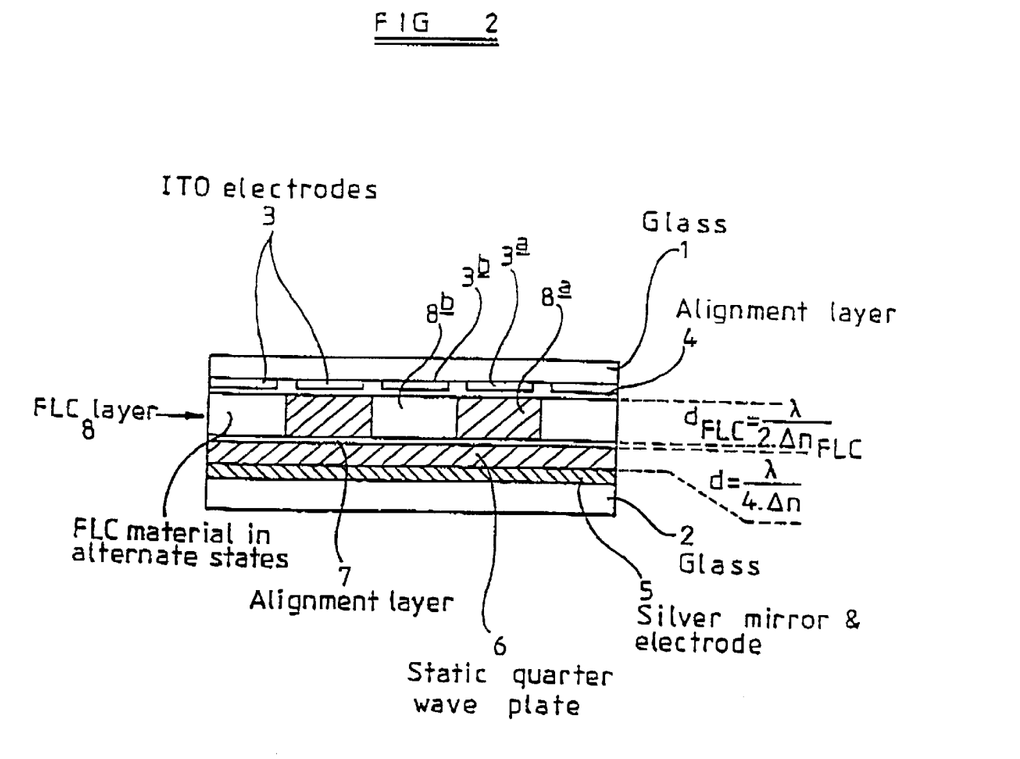
FIG. 2 is a cross sectional diagram of the modulator of FIG. 1.

FIGS. 1 and 2 show a reflection-mode diffractive spatial light modulator (SLM). The SLM comprises a rectangular array of rectangular or substantially rectangular picture elements (pixels), only one of which is shown in FIGS. 1 and 2. The SLM comprises upper and lower glass substrates 1 and 2. The upper substrate 1 is coated with at transparent conducting layer of indium tin oxide (ITO) which is etched to form elongate interdigitated electrodes 3. The electrodes 3 are covered with an alignment layer 4 for a ferroelectric liquid crystal material. In particular, the alignment layer 4 is formed by obliquely evaporating silicon oxide at 84 degrees to the normal to the substrate 1 so as to induce the C1 state in ferroelectric liquid crystal material, for instance of the type known as SCE8 available from Merck. For instance, the alignment layer 4 may have a thickness of approximately 10 nanometers.

A combined mirror and electrode 5 is formed on the glass substrate 2 by depositing silver to a thickness of approximately 100 nanometers. A static quarter waveplate 6 is formed on the silver mirror and electrode 5. This may be provided by spinning on a mixture of a reactive mesogen diacrylate known as RM258 in a suitable solvent such as chlorobenzene with a photoinitiator. This is cured for approximately ten minutes under ultraviolet light in an atmosphere of nitrogen. The thickness of the plate 6 is controlled, for instance by varying the mix ratios of the materials and the spin speed, so that it acts as a quarter waveplate for a predetermined bandwidth in the visible spectrum, for instance centred about 633 nanometers. The thickness d is given by the expression.

$$d = \frac{\lambda}{4\Delta n}$$

where $\lambda$ is the wavelength of the centre of the band and $\Delta n$ is the difference between the ordinary and extraordinary refractive indices of the material of the quarter waveplate 6. The quarter waveplate 6 therefore typically has a thickness of the order of 800 nanometers.

A further alignment layer 7 is formed on the quarter waveplate 6, for instance as described hereinbefore for the alignment layer 4. The substrates 1 and 2 are then spaced apart, for instance by spacer balls of two micrometer diameter, and stuck together so as to form a cell which is filled with the ferroelectric liquid crystal material to form a layer 8. The spacing provides a layer of ferroelectric liquid crystal material which provides a half wave of retardation so that the liquid crystal layer acts as a half wave retarder whose optic axis is switchable as described hereinafter. In particular, the ferroelectric liquid crystal layer has a thickness d given by $$d = \frac{\lambda}{2\Delta n_{FLC}}$$

where $\Delta n_{FLC}$ is the difference between the ordinary and the extraordinary refractive indices of the ferroelectric liquid crystal material.

In order to optimise the brightness of the display, the reflectivity of each interface should preferably be reduced, for instance by applying antireflection coatings to the substrate 1 and by optically burying the electrodes 3.

The electrodes 3 and 5 may be arranged to provide for suitable addressing of the pixels of the SLM. For instance, in a passive matrix addressing arrangement, the electrodes 3 may extend throughout the length of the SLM and may be connected to the outputs of a data signal generator for supplying a row of pixel data at a time to the pixels. The electrode 5 may be extended transversely to form a row electrode connected to the output of a strobe signal generator for strobing the data into the SLM a row at a time in a repeating sequence.

For each pixel, the electrode 5 acts as a common electrode which is connectable to a reference voltage line, for instance supplying zero volts, for strobing data to be displayed at the pixel. Alternate ones of the elongate electrodes 3 are connected together to form two sets of interdigitated electrodes which are connected to receive suitable data signals. Each pixel is switchable between a reflective state and a diffractive state as described hereinafter.

Figure 3:
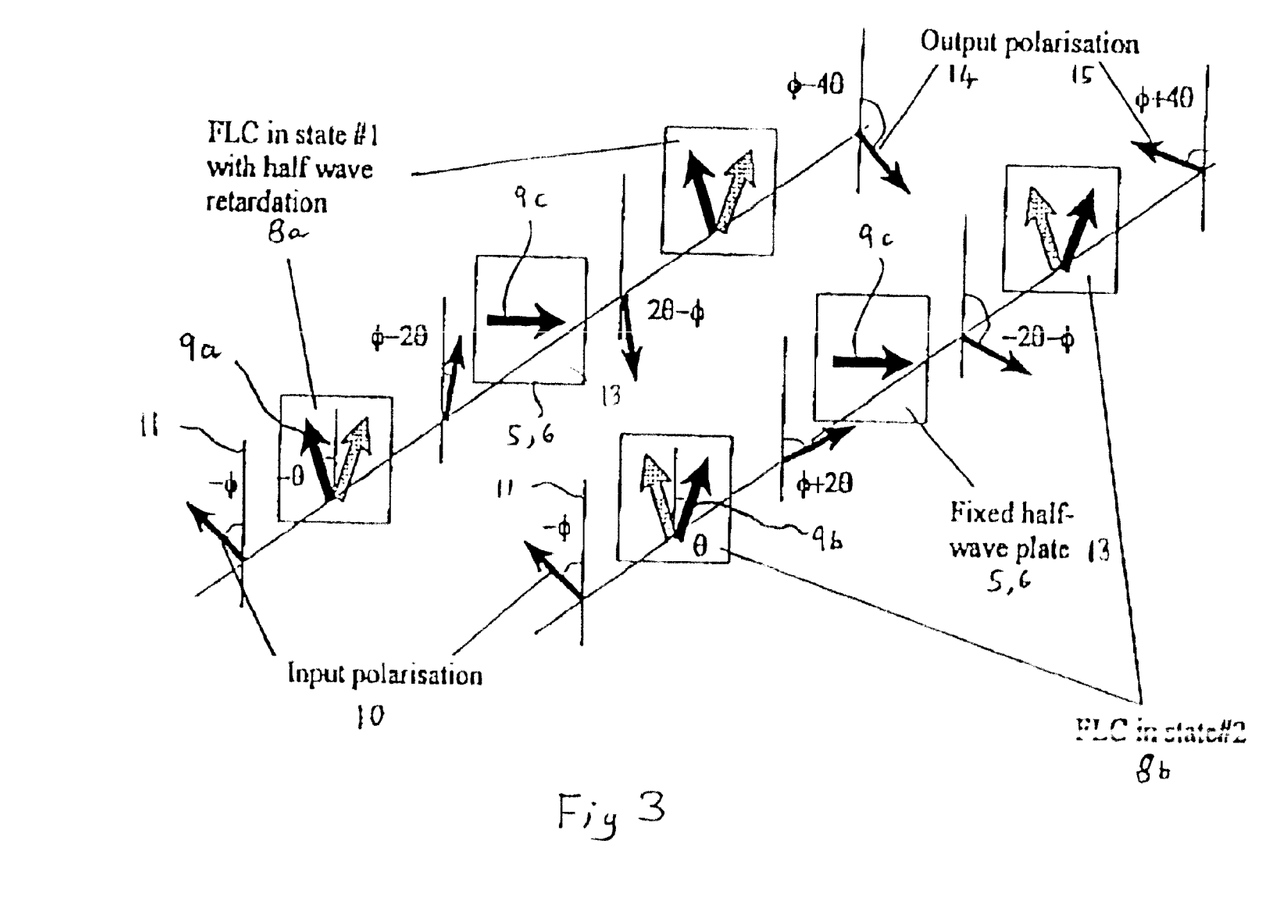
FIG. 3 is a diagram illustrating operation of the modulator of FIGS. 1 and 2.

FIG. 3 illustrates diagrammatically the operation of adjacent strips of the pixel shown in FIGS. 1 and 2 when the pixel is in the diffractive mode. The optical path through each pixel is folded by reflection at the mirror 5 but, for the sake of clarity, the path is shown unfolded in FIG. 3. The SLM acts on unpolarised light, which may be split into components of orthogonal polarisations for the sake of describing operation of the SLM. One of the component polarisations is shown at 10 in FIG. 3 and is at an angle $-\phi$ with respect to a predetermined direction 11.

Voltages which are symmetrical with respect to the reference voltage on the electrode 5 are applied to the two sets of alternating interdigitated electrodes 3a and 3b. Thus, ferroelectric liquid crystal material strips 8a and 8b disposed between the electrodes 3a and 3b and the electrode 5 have optic axes 9a and 9b aligned at angles of $-\theta$ and $+\theta$, respectively, with respect to the direction 11, where $\theta$ is preferably approximately equal to 22.5 degrees.

Each strip 8a of ferroelectric liquid crystal material acts a half wave retarder so that the polarisation of the light component leaving the strip 8a is at an angle of $\phi-2\theta$ with respect to the direction 11. The light component then passes through the static quarter waveplate 6, is reflected by the mirror 5, and again passes through the static quarter waveplate 6, so that the combination of the quarter waveplate 6 and the mirror 5 acts as a half wave retarder whose optic axis 9c is perpendicular to the direction 11. The polarisation direction of light leaving the quarter waveplate 6 and travelling towards the ferroelectric liquid crystal material is "reflected" about the optic axis of the effective half waveplate 13 and thus forms an angle $2\theta-\phi$ with respect to the direction 11. The light component then again passes through the strip 8a of ferroelectric liquid crystal material so that the output polarisation as shown at 14 is at an angle of $100-4\theta$ with respect to the direction 11. Thus, for each input component of arbitrary polarisation direction $-\phi$, the optical path through the SLM via each of the strips 8a of ferroelectric liquid crystal material is such that the polarisation direction is rotated by $-4\theta$. This optical path therefore rotates the polarisation of unpolarised light by $-4\theta$, which is substantially equal to $-90$ degrees.

Each strip 8b of ferroelectric liquid crystal material acts as a half wave retarder and rotates the polarisation direction to $\phi+2\theta$. The fixed half wave retarder formed by the combination of the quarter waveplate 6 and the mirror 5 rotates the direction of polarisation of the light component so that it makes an angle of $-2\theta-\phi$ with respect to the direction 11. The final passage through the strip 8b rotates the polarisation direction to $\phi+4\theta$ as shown at 15. Thus, unpolarised light passing through the strips 8b has its polarisation rotated by $+4\theta$, which is substantially equal to $+90$ degrees.

Light reflected through each of the strips 8b is out of phase by 180 degrees with respect to light passing through each of the strips 8a when the electrodes 3b and 3a are connected to receive data signals of opposite polarity. In this state, the pixel acts as a phase-only diffraction grating and the pixel operates in the diffractive mode. Because of the bistable characteristics of ferroelectric liquid crystals, it is necessary only to supply the data signals in order to switch the strips 8a and 8b to the different modes illustrated in FIG. 3.

In order for the pixels to operate in the reflective mode, it is necessary to switch either or both sets of strips 8a and 8b so that their optic axes are parallel to each other (and to the direction 11). Unpolarised light incident on the pixel is then substantially unaffected by the ferroelectric liquid crystal material and the quarter waveplate 6 and is subjected to specular reflection by the mirror and electrode 5. Each pixels is therefore switchable between a transmission mode, in which light is specularly reflected or "deflected" into the zeroth order diffraction mode, and a diffractive mode, in which light incident on the pixel is deflected into the non-zero diffractive orders.

It is thus possible to provide a diffraction SLM for use with unpolarised light so as to provide increased optical modulation efficiency compared with SLMs which require polarised light. The provision of the quarter waveplate 6 and the mirror 5 between the substrates 1 and 2 allows higher resolution to be achieved. In particular, for the device to operate correctly in the diffractive mode, light rays passing through each strip 8a or 8b should be reflected by the mirror 5 back through the same strip. The thickness of the strips 8a and 8b is typically of the order of 2 micrometers whereas the substrate 2 has a thickness of the oder of a millimeter. Thus, if the mirror 5 were disposed outside the substrates 1 and 2, parallax errors would severely limit the angular range of incident light and/or the minimum size of pixels. For a typical thickness of 2 micrometers of the ferroelectric liquid crystal material, a strip electrode pitch of the order of 5 micrometers may be used so that it is possible to provide a higher resolution device which is capable of providing high optical modulation efficiency and high contrast ratio in odd diffractive orders. Further, the diffractive SLM relies on essentially conventional liquid crystal technology with no moving parts so that the reliability, production yield, and operation lifetime are similar to conventional ferroelectric liquid crystal displays.

Figure 4:
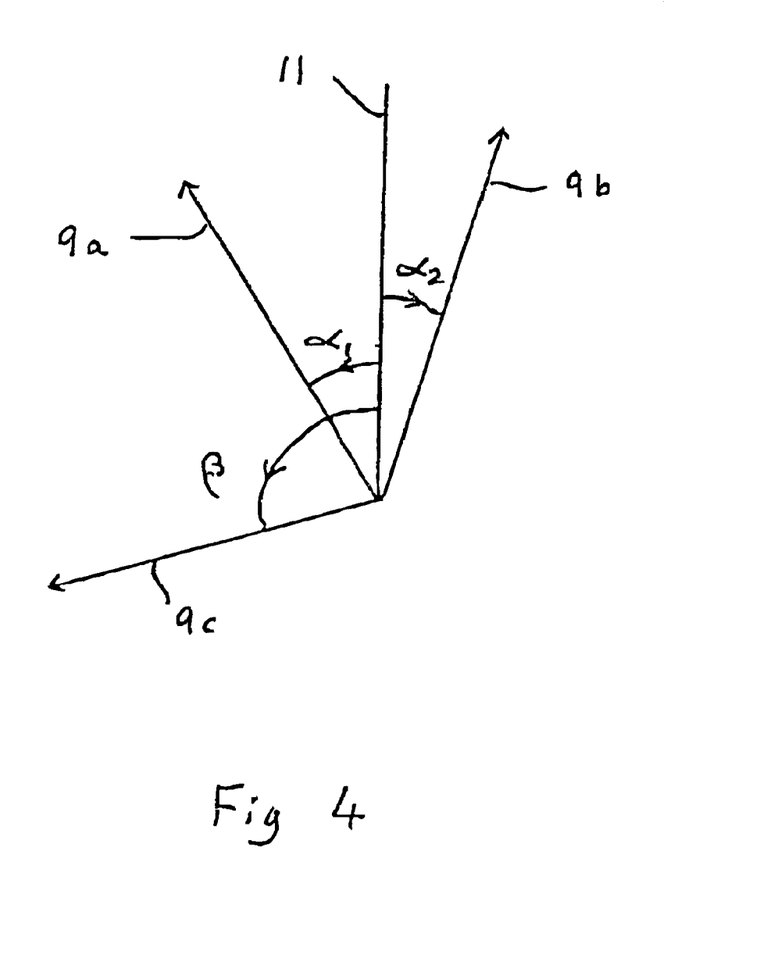
FIG. 4 is a diagram illustrating orientation of optic axes.

In order to provide improved achromatic performance, the optic axis 9c is oriented such that it is not between the switched directions 9a and 9b of the optic axis of the liquid crystal material of the layer 8. FIG. 4 illustrates the general case of this for arbitrary directions and angles. The optic axis 9a is oriented at an angle of $\alpha_1$ relative to the (arbitrary) reference direction 11 whereas the optic axis 9b is oriented at an angle $\alpha_2$ (which will be negative in this case) relative to the direction 11. Improved achromatic performance is achieved by orienting the fixed optic axis 9c at an angle $\beta$ relative to the direction 11 such that the axis 9c is outside the (smaller) angle defined by the axes 9a and 9b. This condition may conveniently be defined by the expression:

$$\alpha_2 + 180° > \beta > \alpha_1.$$

The improved achromatic performance is achieved for angles $\alpha_1$ and $\alpha_2$ which are such that the difference between these angles is less than 90°. The convention for the sign of these angles is illustrated by the arrows on the arcs of FIG. 4 such that anti-clockwise rotation from the direction 11 is represented by a positive value whereas clockwise rotation is represented by a negative value. Thus, in the specific embodiment described with reference to FIG. 3 where the angles $\alpha_1$ and $\alpha_2$ are equal to + and −22.5°, respectively, the angle $\beta$ can have any value between 22.5° and 157.5°. It should also be noted that optic axes whose directions differ by 180° or an integer multiple thereof are completely equivalent to each other.

The achromatic performance is improved with this arrangement as compared with arrangements in which the fixed optic axis 9c lies between the optic axes 9a and 9b. However, optimum achromatic performance is achieved when the fixed optic axis 9c is substantially perpendicular to the bisector of the optic axes 9a and 9b. This is illustrated in FIG. 3, where the bisector is parallel to the reference direction 11 and the optic axis 9c is perpendicular thereto.

The improved achromaticity allows the spatial light modulator to operate with improved efficiency over a greater portion of the visible spectrum. This allows, for example, the use of three identical spatial light modulators in a projection optical system where the modulators are used to modulate separately red, green and blue components without substantially reduced efficiency for any of the colours. Similarly, a single modulator system for wider band operation can be provided.

Figure 5:
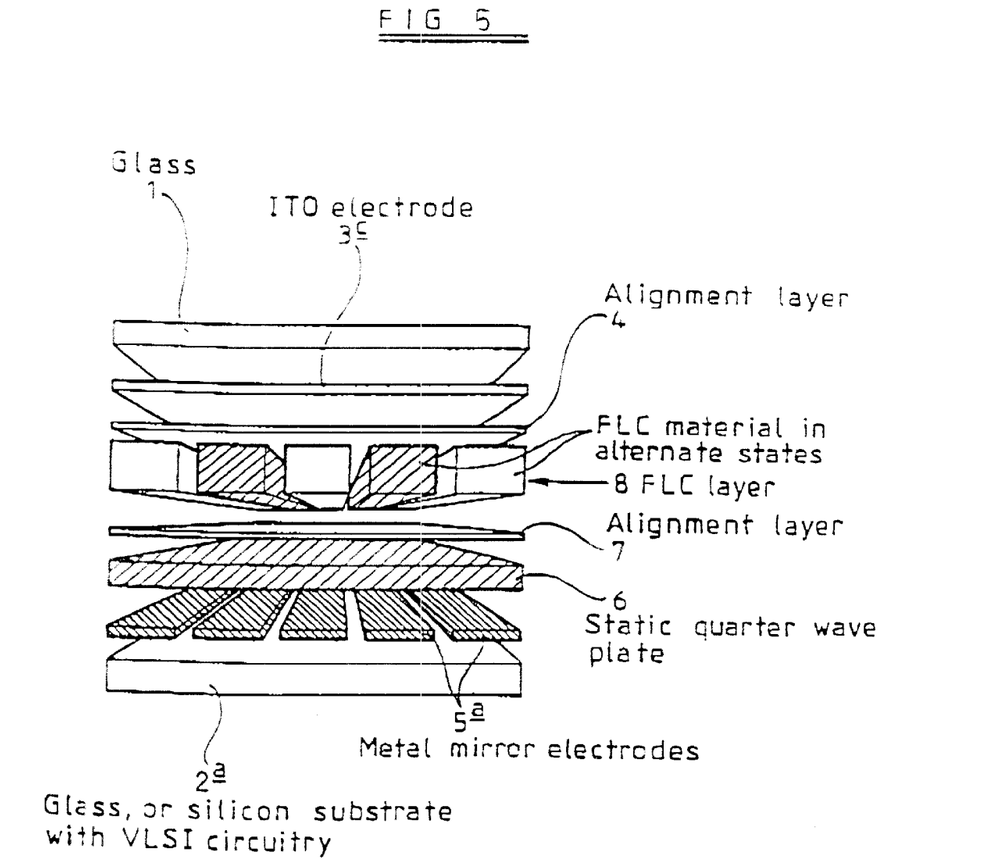
FIGS. 5 and 6 are views similar to FIGS. 1 and 2, respectively, of a spatial light modulator constituting another embodiment of the invention.
Figure 6:
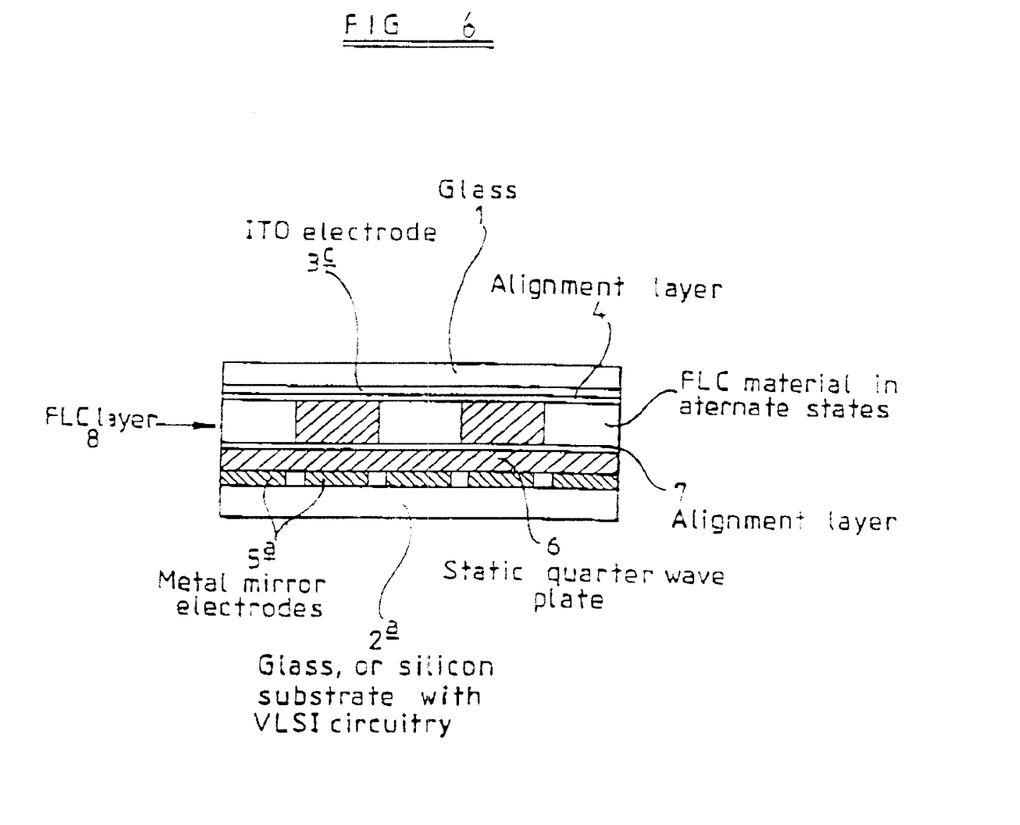

FIGS. 5 and 6 illustrate another reflective mode diffractive SLM which differs from that shown in FIGS. 1 and 2 in that the ITO electrodes 3 are replaced by a continuous electrode 3c and the mirror and electrode 5 is replaced by interdigitated strip mirror electrodes 5a. Further, the glass of substrate 2 may be replaced by a silicon substrate carrying VLSI circuitry for manipulating data to be displayed. For instance, the circuitry may include addressing circuitry for the pixels and optionally other data processing circuitry.

Figure 7:
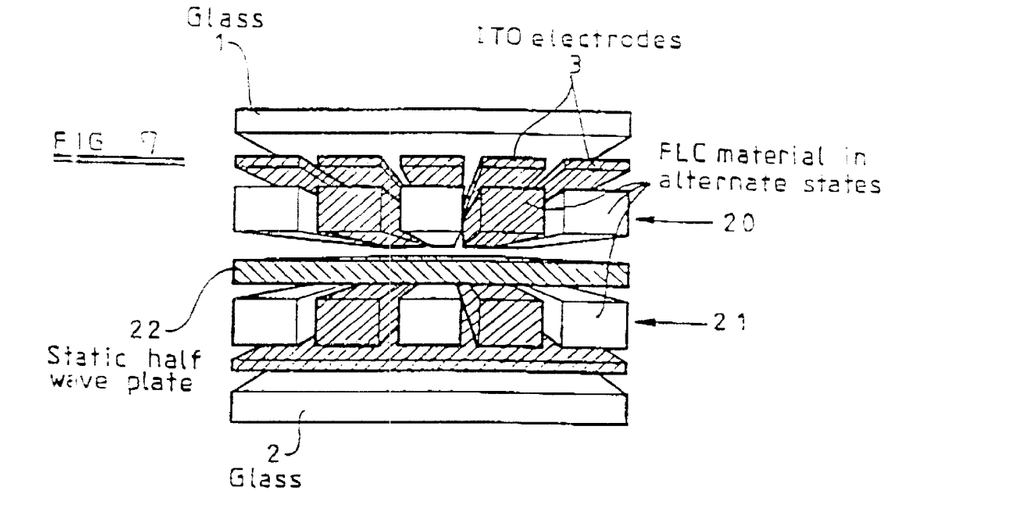
FIGS. 7 and 8 are views corresponding to FIGS. 1 and 2, respectively, of a spatial light modulator constituting a further embodiment of the invention.
Figure 8:
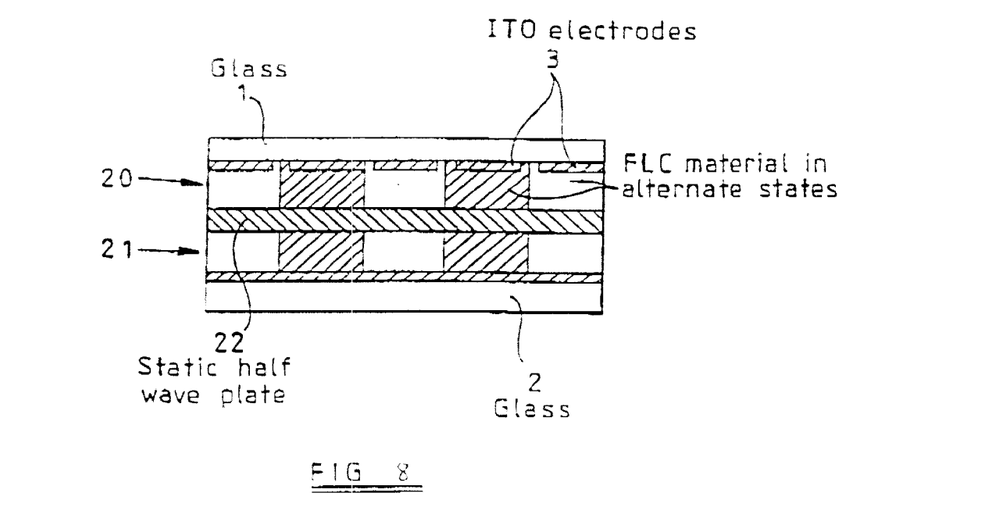

FIGS. 7 and 8 illustrate a transmissive mode diffractive SLM including a glass substrate 1, ITO electrodes 3, and a glass substrate 2 as shown in FIGS. 1 and 2. The SLM further comprises two ferroelectric liquid crystal layers 20 and 21 provided with alignment layers similar to the layers 4 and 7 of FIGS. 1 and 2 but not shown for the sake of clarity. The two liquid crystal cells are separated by a static half waveplate 22. The arrangement of the strip electrodes 3 permits the formation of optically aligned ferroelectric liquid crystal strips in the two layers 20 and 21 so that each strip in each of the layers 20 and 21 operates as a half wave retarder whose optic axis is switchable between plus and minus approximately 22.5 degrees with the optic axes of aligned strips in the two layers 20 and 21 being parallel to each other. This device therefore acts as a transmissive SLM in which each pixel is switchable between a transmissive mode, in which light passes through the pixel without deflection (equivalent to zeroth order diffraction), and a diffractive mode, in which light is deflected into non-zero diffractive orders. By disposing all of the optically active layers between the substrates 1 and 2, parallax errors are greatly reduced allowing the provision of a high resolution SLM with a useful acceptance angle for input light and with high optical modulating efficiency and high contrast ratio performance.

In the embodiments described hereinbefore, the switching angle between the two optic states of the ferroelectric liquid crystal material has been assumed to be 45 degrees. This is the switching angle which is required, at least theoretically, for optimum performance in terms of optical modulator efficiency. Further, such switching angles are readily achievable in known ferroelectric liquid crystal materials without any of the loss of performance associated with materials and arrangements providing higher switching angles between optic axes. However, switching angles which differ slightly from 45 degrees may also be used and may provide acceptable performance. For instance, it is believed that switching angles which differ by up to about 5 degrees, and even up to about 10 degrees, from the optimum 45 degrees may provide acceptable performance for many applications.

Figure 9:
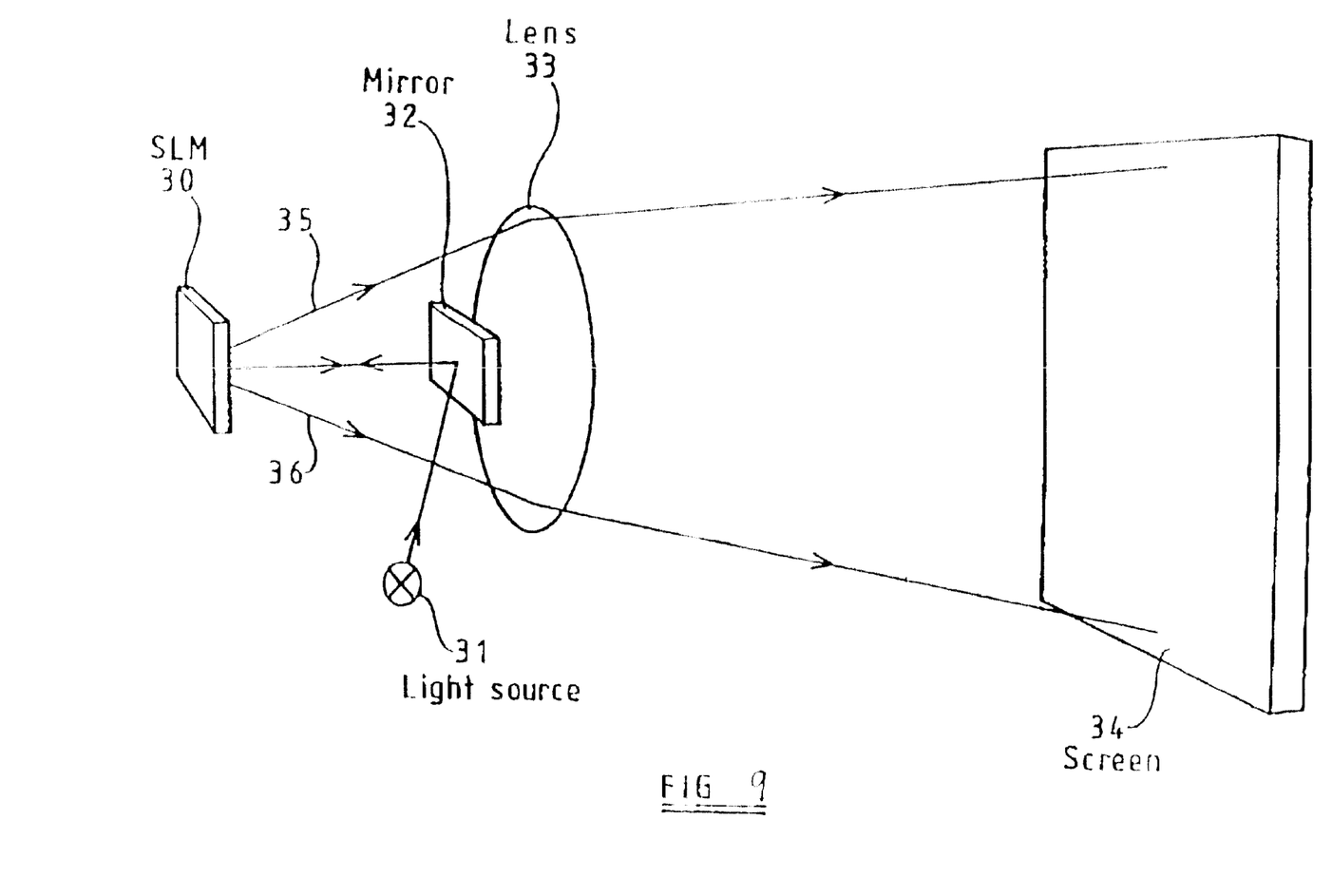
FIGS. 9 and 14 are schematic diagrams of projection displays constituting respective embodiments of the invention.

FIG. 9 illustrates a projection display using an SLM' 30 of the type shown in FIGS. 1 and 2 or in FIG. 5 and 6. The SLM 30 is illuminated by a light source 31 via a mirror 32. A projection lens 33 projects an image displayed by the SLM 30 onto a screen 34.

Light from the light source 31 is reflected by the mirror 32 so as to be incident normally on the LSM 30. Each pixel which is in the reflective mode reflects the incident light normally back to the mirror 32 so that the reflected light is not projected by the lens 33. Thus, a "dark" pixel is imaged on the screen 34 by the lens 33. Each pixel in the diffractive mode deflects the incident light into the non-zero diffractive orders, mainly into the positive and negative first orders, and the positive and negative second orders as illustrated by light rays 35 and 36. Where the grating formed is more sinusoidal in nature, for example with a nematic LC, collection of first and higher orders improves efficiency. The light from each such pixel is thus imaged to a "bright" pixel on the screen 34.

The SLM 30 operates with unpolarised light so that the image intensity or brightness is substantially greater than known projection displays which require polarised light. Each pixel deflects little or not light into the first order diffraction lobes when in the reflective mode so that the contrast ratio i.e. the ratio between light intensities at the screen for a pixel in the reflective and diffractive modes, is very high. It is thus possible to provide a projected image of high brightness and good contrast.

Figure 10:
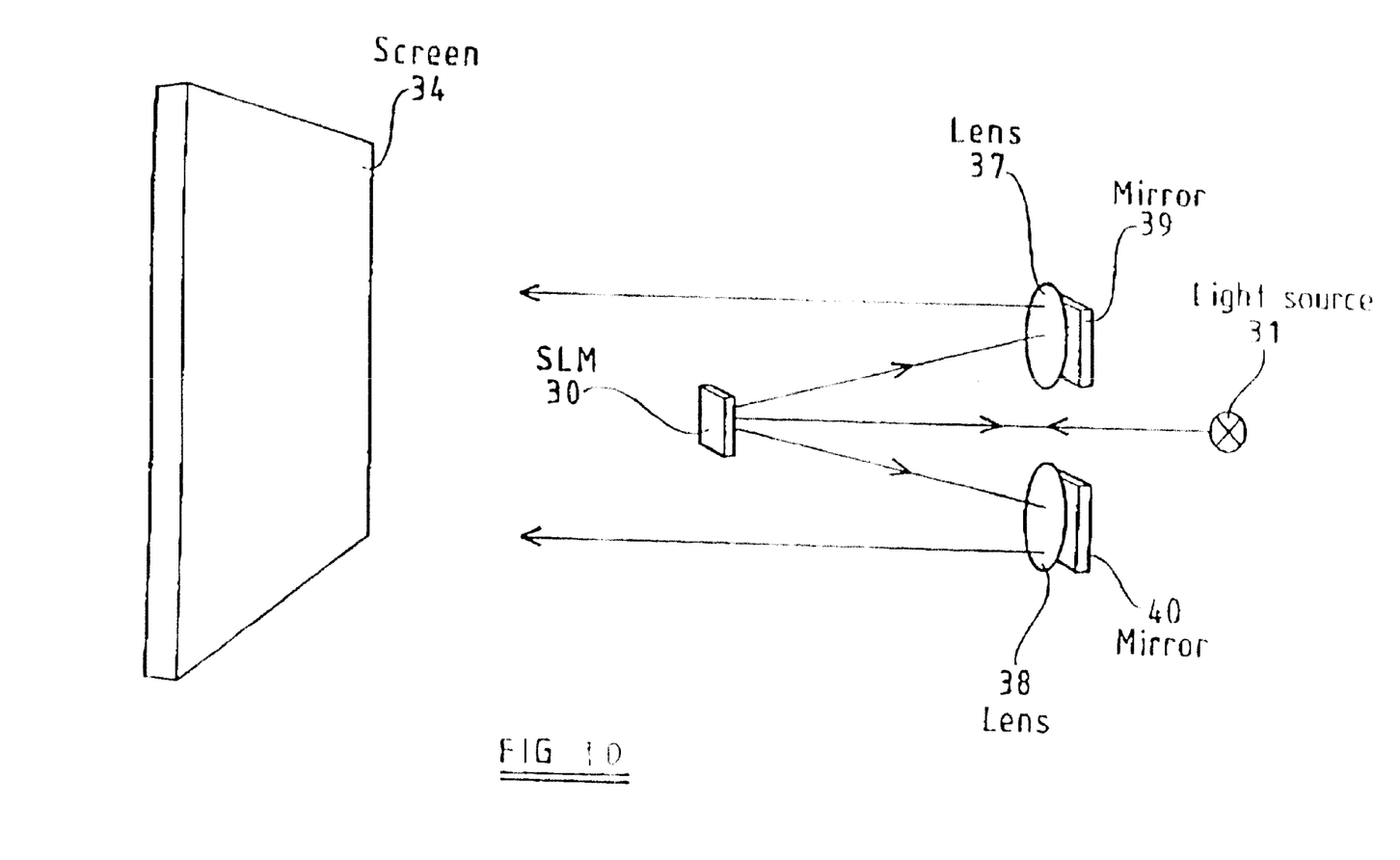

The projection display shown in FIG. 10 differs from that shown in FIG. 9 in that the light source 31 supplies light directly to SLM 30, which light is incident normally to the SLM. Further, the lens 33 is replaced by lenses 37 and 38 and mirrors 39 and 40. The lens 33 of FIG. 9 is relatively large and therefore expensive. In the display of FIG. 10, light diffracted into the positive and negative first order lobes is collected by the lenses 37 and 38, respectively, reflected by the mirrors 39 and 40, respectively, and imaged by the lenses 37 and 38, respectively, on the screen 34. Thus, much smaller lenses of equivalent optical performance may be provided so that the projection optics of the display shown in FIG. 10 are substantially less expensive that the lens 33 of FIG. 9.

Figure 11:
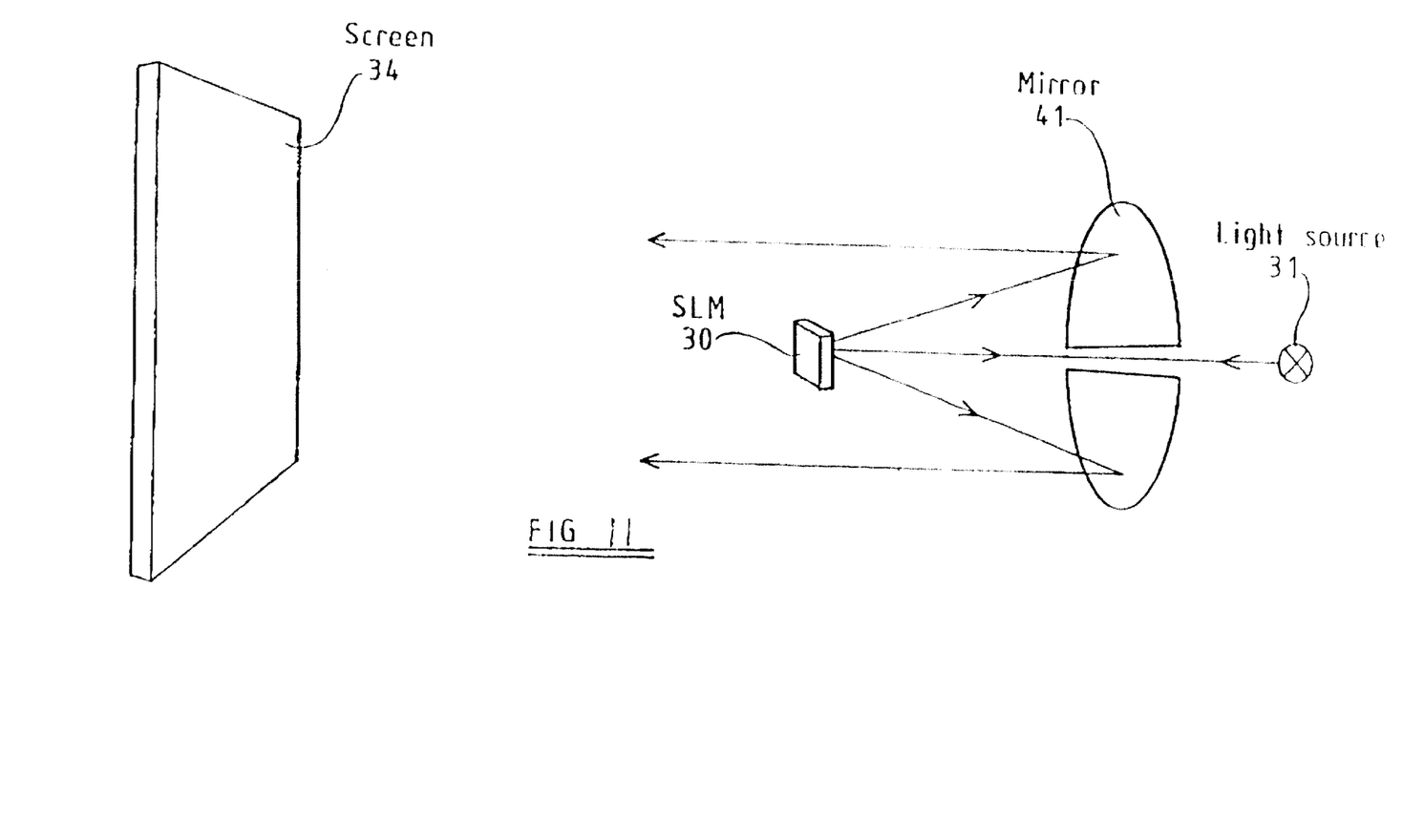

The projection display shown in FIG. 11 differs from that shown in FIG. 10 in that the lenses 37 and 38 and the mirrors 39 and 40 are replaced by a mirror 41 which is shown as a split mirror to allow passage of the light from the light source 31.

Figure 12:
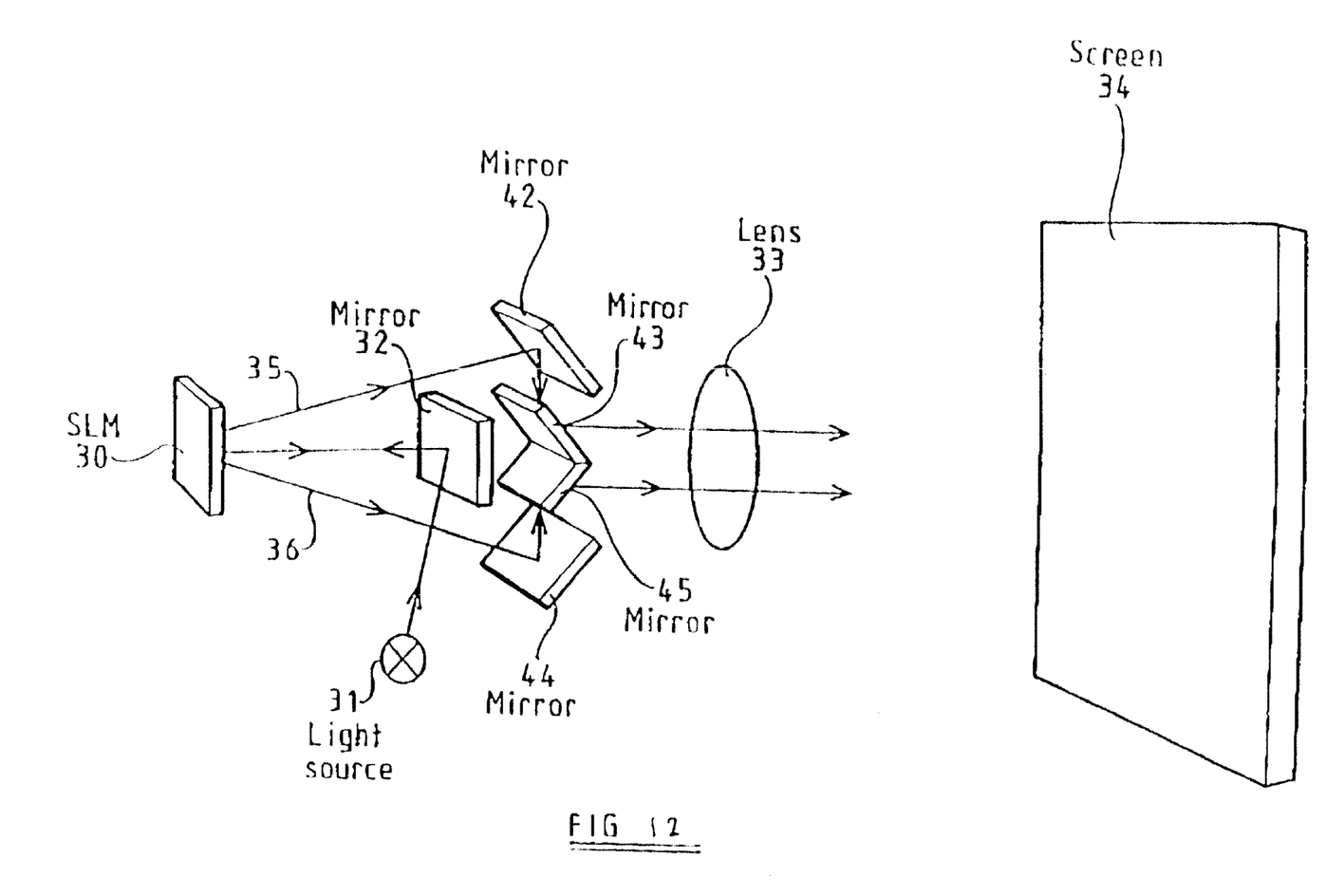

FIG. 12 shows a projection display which differs from that shown in FIG. 9 in that a mirror arrangement is provided for combining light from the positive and negative first order lobes before imaging by the lens 33 on the screen 34. In particular, the light 35 in the positive first order lobe is deflected by mirrors 42 and 43 whereas light 36 in the negative first order lobe is deflected by mirrors 44 and 45. This allows a smaller and less expensive lens 33 to be used and also permits the use of less expensive zoom projection optics.

Figure 13:
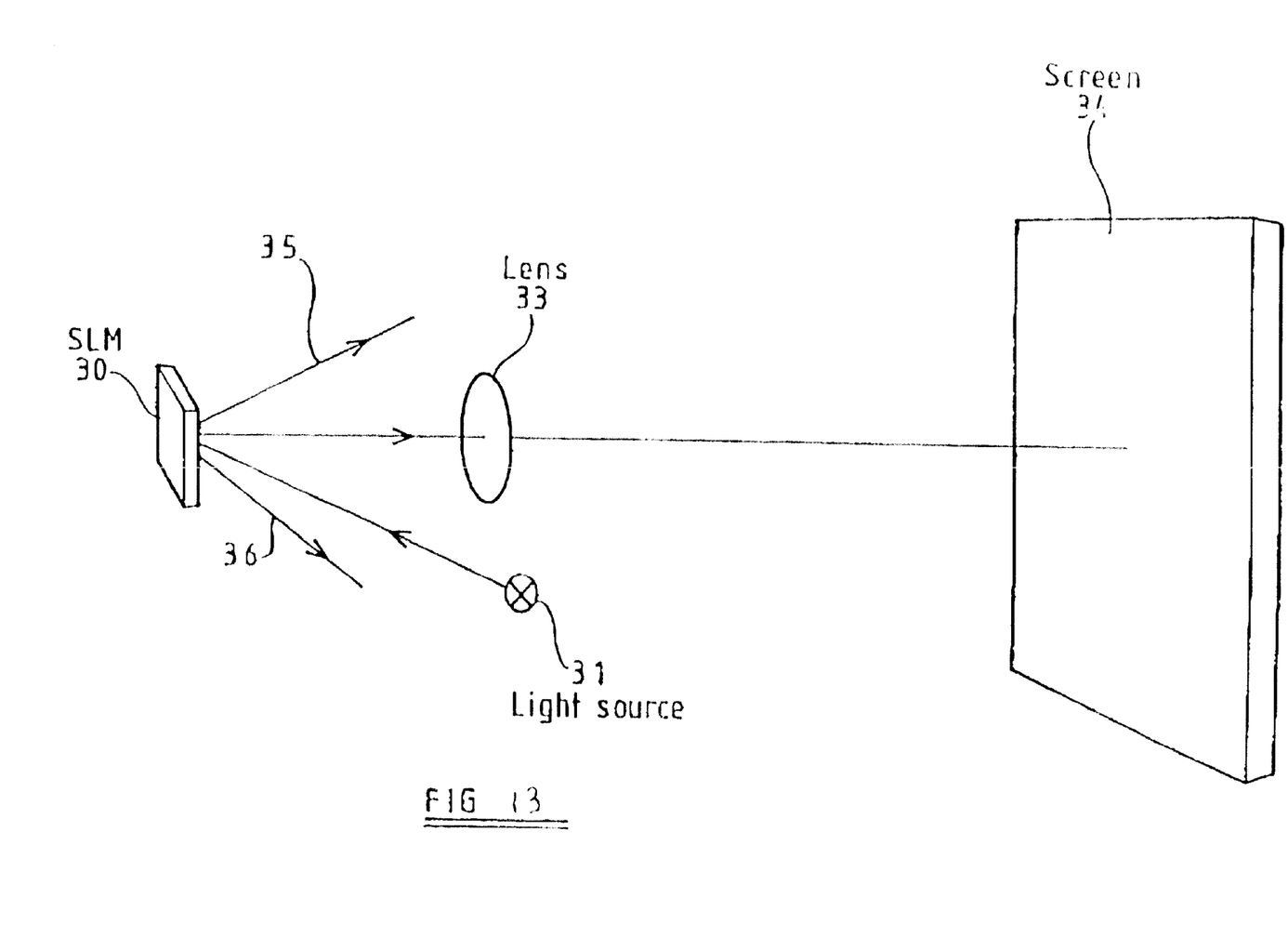

The projection display shown in FIG. 13 differs from that shown in FIG. 9 in that light from zeroth order diffraction is imaged on the screen 34 by the lens 33. Thus, light reflected by each pixel in the reflective mode is used to form bright image pixels on the screen 34. Pixels in the diffractive mode deflect light into the non-zeroth order lobes as illustrated at 35 and 36 and such light is not imaged by the lens 33 on the screen 34 so that dark pixel images are formed on the screen 34 corresponding to the pixels in the diffractive mode. The contrast ratio of a display of this type is largely dependent on the light reflected from the various interfaces within the SLM 30 in the diffractive mode so that, without taking special precautions to reduce such reflection, the contrast ratio may not be as high as for displays in which light from a non-zeroth order diffraction lobe is used to form the image.

In order to form a colour image, three SLMs may be used with red, green, and blue light sources and with the pitches of the diffraction grating formed by each pixel in the diffractive mode and the layer thicknesses adjusted to optimise performance for the associated wavelength. Suitable beam combining techniques may then be used to combine the red, green ,and blue images into a full colour image at the screen 34. Although the diffraction angle of a diffraction grating varies with the wavelength of the incident light, this is of no consequence in displays of the type shown in FIG. 13 suing zeroth order diffraction light to form the image since it is merely necessary in the diffraction mode for all of the visible light to be deflected away from the lens 33. Thus, displays of the type shown in FIG. 13 may provide a colour image by means of colour filtering at the pixels or by colour sequential multiplexing.

Figure 14:
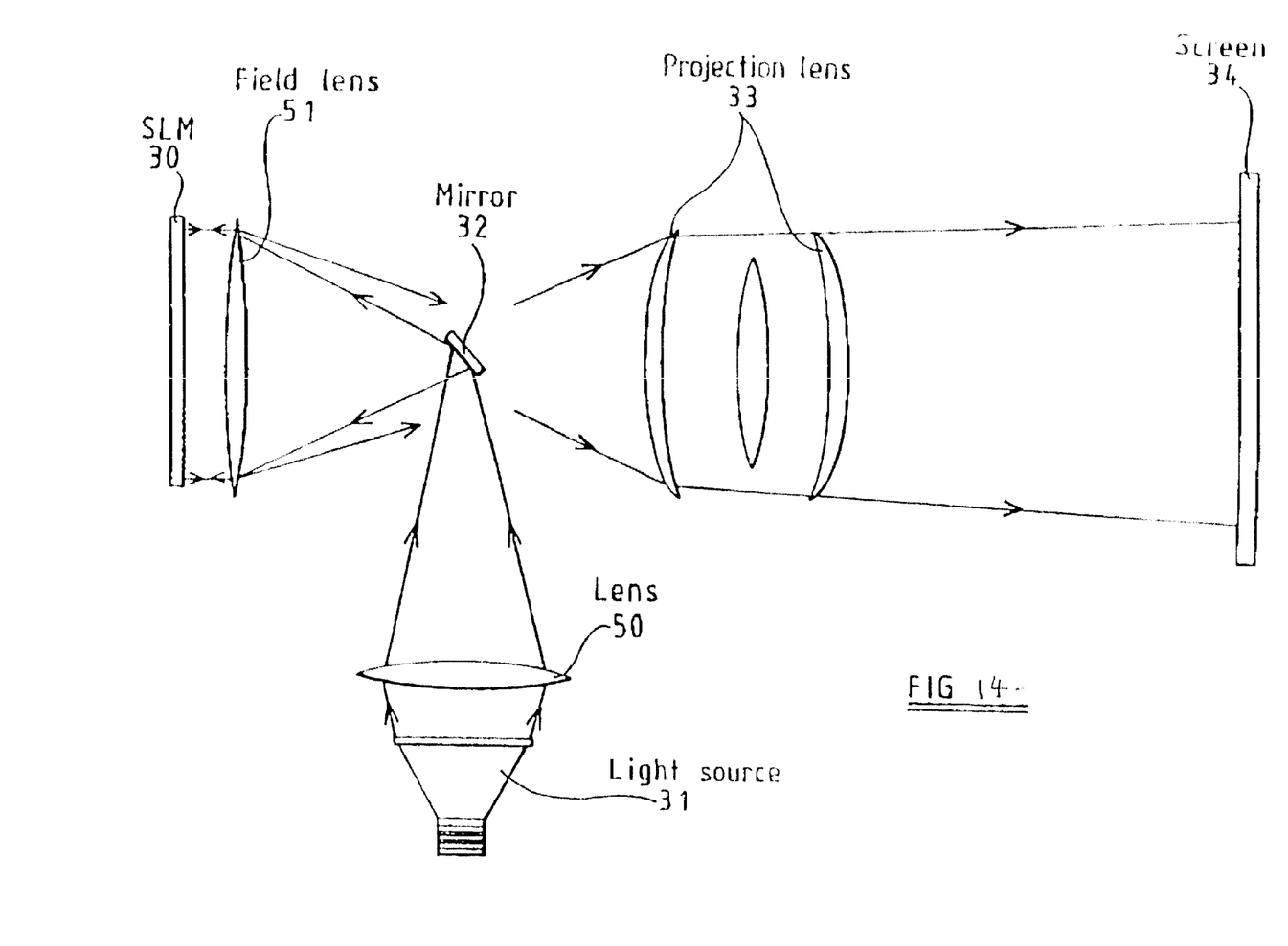

FIG. 14 illustrates a projection display of the type shown in FIG. 9 using a known type of Schlieren optical system. The display of FIG. 14 differs from that of FIG. 9 in that a lens 50 images the light source 31 at the mirror 32 and a field lens 51 is provided adjacent the SLM 30. This arrangement allows a relatively small mirror 32 to be provided and allows the optical performance of the projection system to be improved.

The split optical systems described hereinbefore, for instance the "two mirror" type shown in FIG. 10, may be used with the arrangement shown in FIG. 14 to provide potential reductions in cost and system size.

Various modifications may be made within the scope of the invention. For example, the ferroelectric liquid crystal in the layer 8 may be replaced by antiferroelectric or other smectic liquid crystal or by in plane switching nematic liquid crystal. The alignment layers 4 and 7 may be modified as necessary or desirable.

An example of an embodiment of the invention using such an in-plane switching nematic liquid crystal (NLC) makes use of the same cell structure as described hereinbefore the FLC embodiments. However, a homogeneously aligned NLC whose molecules are aligned parallel to the substrates is used in place of the FLC. The alignment direction of the liquid crystal, for example determined by the rushing direction of polyimide alignment layers, is set at 45° to the longitudinal axis of the electrodes. This results in 45° in-plane switching of the NLC and therefore produces efficient polarisation independent optical diffraction similar to that of the FLC embodiments described hereinafter.

Although the NLC could be aligned at close to 90° to the electrodes to produce substantially 90° switching with no need for an internal waveplate, the material switch-on time would be insufficient for video display panels with currently available materials. Furthermore, a negative dielectric material is preferable to the more common NLC materials in order to restrict out-of-plane switching and subsequent polarisation mixing which could compromise diffraction efficiency. As the material is expected to switch in regions between the grating electrodes and not to switch immediately above the electrodes, interdigitated electrodes with a mark space ratio of one, in which the electrode width is substantially equal to the electrode gap, are preferred.

What is claimed is:

1. A diffractive spatial light modulator comprising first and second substrates, a half wave retarder disposed between the first and second substrates, a quarter wave retarder disposed between the half wave retarder and the second substrate, and a reflector disposed between the quarter wave retarder and the second substrate, the half wave retarder comprising a plurality of picture elements, each of which comprises a plurality of first elongate regions interdigitated with a plurality of second elongate regions, the first regions having optic axes which are switchable between a first direction and a third direction, the second regions having optic axes which are switchable between a second direction and the third direction, and the quarter wave retarder having a fixed optic axis, the first and second directions being oriented at angles $\alpha_1$ and $\alpha_2$, respectively, relative to an arbitrary reference direction and the optic axis of the quarter wave retarder being oriented at an angle $\beta$ relative to the reference direction such that $(\alpha_1-\alpha_2)<90°$ and $\alpha_2+180°>\beta>\alpha_1$.

2. A modulator according to claim 1, in which $(\alpha_1-\alpha_2)$ is between 35 and 55 degrees.

3. A modulator according to claim 2, in which $(\alpha_1-\alpha_2)$ is between 40 and 50 degrees.

4. A modulator according to claim 3, in which $(\alpha_1-\alpha_2)$ is substantially equal to 45 degrees.

5. A modulator according to claim 1, in which the optic axis of the quarter wave retarder is substantially perpendicular to the bisector of the first and second directions.

6. A modulator according to claim 1, in which the half wave retarder comprises a liquid crystal layer.

7. A modulator according to claim 6, in which the liquid crystal layer comprises a ferroelectric liquid crystal layer.

8. A modulator according to claim 6, in which the liquid crystal layer is disposed between first and second alignment layers.

9. A modulator according to claim 8, in which each of which first and second alignment layers comprises an obliquely evaporated layer of silicon oxide.

10. A modulator according to claim 1, in which a first transparent electrode layer is disposed between the first substrate and the half wave retarder.

11. A modulator according to claim 10, in which a second electrode layer is disposed between the second substrate and the half wave retarder.

12. A modulator according to claim 11, in which at least one of the first and second electrode layers comprises a plurality of electrode picture elements aligned with the picture elements of the half wave retarder, each electrode picture element comprising first and second electrode regions aligned with the first and second regions, respectively, of the half wave retarder.

13. A modulator according to claim 11, in which the second electrode layer constitutes the reflector.

14. A display comprising by a spatial light modulator according to claim 1.

15. A display according to claim 14, comprising by a light source for illuminating the modulator and an optical projection system for receiving light only from a predetermined diffractive order from the modulator.

16. A display according to claim 15, in which the predetermined diffractive order is the zeroth diffractive order.

17. A display according to claim 15, in which the predetermined diffractive order includes a first diffractive order but also possibly higher orders.

18. A diffractive spatial light modulator comprising first and second substrates, a first half wave retarder disposed between the first and second substrates, a second half wave retarder disposed between the first half wave retarder and the second substrate, and a third half wave retarder disposed between the second half wave retarder and the second substrate, the first retarder comprising a plurality of picture elements, the third retarder comprising a plurality of picture elements aligned with the picture elements of the first retarder, each of the picture elements of each of the first and third retarders comprising a plurality of first elongate regions interdigitated with a plurality of second elongate regions, the first regions having optic axes which are switchable together between a first direction and a third direction, the second regions having optics axes which are switchable together between a second direction and the third direction, and the second half wave retarder having a fixed optic axis, the first and second directions being oriented at angles $\alpha_1$ and $\alpha_2$, respectively, relative to an arbitrary reference direction and the optic axis of the second half were retarder being oriented at an angle $\beta$ relative to the reference direction such that $(\alpha_1-\alpha_2)<90°$ and $\alpha_2+180°>\beta>\alpha_1$.

19. A modulator according to claim 18, in which $(\alpha_1-\alpha_2)$ is between 35 and 55 degrees.

20. A modulator according to claim 19, in which $(\alpha_1-\alpha_2)$ is between 40 and 50 degrees.

21. A modulator according to claim 20, in which $(\alpha_1-\alpha_2)$ is substantially equal to 45 degrees.

22. A modulator according to claim 18, in which the optic axis of the second half retarder is substantially perpendicular to the bisector of the first and second directions.

23. A modulator according to claim 18, in which each of the first and third retarders comprises a liquid crystal layer.

24. A modulator according to claim 23, in which each of the liquid crystal layers comprises a ferroelectric liquid crystal layer.

25. A modulator according to claim 23, in which each of the liquid crystal layers is disposed between first and second alignment layers.

26. A modulator according to claim 25, in which each of the first and second alignment layers comprises an obliquely evaporated layer of silicon oxide.

27. A modulator according to claim 18, in which a first transparent electrode layer is disposed between the first substrate and the first half wave retarder.

28. A modulator according to claim 27, in which a second transparent electrode layer is disposed between the second substrate and the third retarder.

29. A modulator according to claim 28, in which at least one of the first and second electrode layers comprises a plurality of electrode picture elements aligned with the picture elements of the first and third retarders, each of the electrode picture elements comprising first and second electrode regions aligned with the first and second regions, respectively, of the first and third retarders.

30. A display comprising by a spatial light modulator according to claim 18.

31. A display according to claim 30, comprising by a light source for illuminating the modulator and an optical projection system for receiving light only from a predetermined diffractive order from the modulator.

32. A display according to claim 31, in which the predetermined diffractive order is the zeroth diffractive order.

33. A display according to claim 31, in which the predetermined diffractive order includes a first diffractive order but also possibly higher orders.

\* \* \* \* \*